(12) United States Patent
Bhunia et al.

(10) Patent No.: US 11,856,096 B2
(45) Date of Patent: Dec. 26, 2023

(54) DEFENSE OF JTAG I/O NETWORK

(71) Applicant: University of Florida Research Foundation, Incorporated, Gainesville, FL (US)

(72) Inventors: Swarup Bhunia, Gainesville, FL (US); Christopher Vega, Gainesville, FL (US); Shubhra Deb Paul, Gainesville, FL (US); Parker Difuntorum, Gainesville, FL (US); Reiner Dizon, Gainesville, FL (US); Patanjali Sristi Lakshmiprasanna Sriramakumara, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 17/303,648

(22) Filed: Jun. 3, 2021

(65) Prior Publication Data

US 2021/0391985 A1 Dec. 16, 2021

Related U.S. Application Data

(60) Provisional application No. 63/038,208, filed on Jun. 12, 2020.

(51) Int. Cl.
*H04L 9/08* (2006.01)
*G06F 1/04* (2006.01)

(52) U.S. Cl.
CPC ............... *H04L 9/088* (2013.01); *G06F 1/04* (2013.01); *H04L 9/0869* (2013.01)

(58) Field of Classification Search
CPC .......... H04L 9/088; H04L 9/0869; G06F 1/04
See application file for complete search history.

(56) References Cited

U.S. PATENT DOCUMENTS

| | | | |
|---|---|---|---|
| 2007/0192874 A1* | 8/2007 | Tucker | H04L 9/12 726/28 |
| 2007/0239995 A1* | 10/2007 | Tucker | G06F 21/72 713/189 |
| 2011/0093751 A1* | 4/2011 | Boezen | G01R 31/318572 714/E11.155 |

(Continued)

OTHER PUBLICATIONS

"IEEE Standard For Test Access Port and Boundary-Scan Architecture," IEEE Standards Association, IEEE Std. 1149.1™—2013 (Revision of IEEE Std 1149.1-2001), (444 pages), May 13, 2013, DOI: 10.1109/IEEESTD.2013.6515989.

(Continued)

*Primary Examiner* — Phy Anh T Vu
(74) *Attorney, Agent, or Firm* — ALSTON & BIRD LLP

(57) ABSTRACT

An integrated circuit includes, in part, a key management unit configured to generate a seeding key during a start-up phase, an encryption module configured to encrypt data using the seeding key and deliver the encrypted data to a second integrated circuit, and an encoder configured to encode the seeding key and deliver the encoded seeding key to the second IC. The second integrated circuit includes, in part, a decoder configured to decode the seeding key. Each of the integrated circuits further includes, in part, a linear-feedback shift register that receives the same clock signals and loads the seeding key.

19 Claims, 16 Drawing Sheets

(56) References Cited

U.S. PATENT DOCUMENTS

| | | | | |
|---|---|---|---|---|
| 2012/0183135 A1* | 7/2012 | Paral | ............... | G09C 1/00 |
| | | | | 380/44 |
| 2013/0019324 A1* | 1/2013 | Tehranipoor | ......... | H03K 3/0315 |
| | | | | 726/34 |
| 2014/0189890 A1* | 7/2014 | Koeberl | ............. | G09C 1/00 |
| | | | | 726/34 |
| 2015/0067895 A1* | 3/2015 | Vasyltsov | ............. | H04L 9/3278 |
| | | | | 726/32 |
| 2015/0319000 A1* | 11/2015 | Falk | ............. | H04L 9/3278 |
| | | | | 713/189 |
| 2017/0126414 A1* | 5/2017 | Goel | ............. | G06F 3/0679 |
| 2017/0131355 A1* | 5/2017 | Johnson | ............. | G06F 21/79 |
| 2017/0295026 A1* | 10/2017 | Guilley | ............. | G06F 11/263 |
| 2019/0158299 A1* | 5/2019 | Poo | ............. | H04L 9/0861 |
| 2020/0065456 A1* | 2/2020 | Tehranipoor | ............. | G06F 21/14 |
| 2020/0195432 A1* | 6/2020 | Doll | ............. | G06F 21/79 |

OTHER PUBLICATIONS

"Technical Guide To JTAG—XJTAG Tutorial," XJTAG, (8 pages), (Online), [Retrieved from the Internet Aug. 24, 2021] <https://www.xjtag.com/about-jtag/jtag-a-technical-overview/>.

* cited by examiner

DEFENSE OF JTAG I/O NETWORK

RELATED APPLICATION

The present application claims benefit under 35 USC 119(e) of U.S. Patent Application No. 63/038,208, filed Jun. 12, 2020, the content of which is incorporated herein by reference in its entirety.

TECHNICAL FIELD

The present application relates to integrated circuits, and more particularly to encrypting the input/output data of an integrated circuit.

BACKGROUND

Current integrated circuits (IC) such as, for example, field programmable gate arrays (FPGAs), generally provide security for the IC's core logic while leaving the input/output (I/O) pins of the IC unprotected. Consequently, an attacker may be able to access or observe outputs of an integrated circuit via the I/O pins. An unauthorized third-party may also be able to gather information regarding an underlying implementation of an IC even when the core logic is obfuscated. Attacks on obfuscated logic such as, for example, a satisfiability attack (SAT), a key synchronization attack (KSA), and fault attacks, generally utilize unprotected I/O pins to attack the obfuscated logic.

SUMMARY

A method of encrypting data delivered from a first integrated circuit (IC) includes, in part, generating a seeding key during a start-up phase, encrypting the data using the seeding key to generate the encrypted data, encoding the seeding key, delivering the encoded seeding key to a second IC, and delivering the encrypted data to the second IC.

In one embodiment, the method further includes, in part, loading the seeding key to a linear-feedback shift register disposed in the first IC. In one embodiment, the method further includes, in part, decoding the seeding key at the second IC, and loading the decoded seeding key to a linear-feedback shift register disposed in the second IC. In one embodiment, the method further includes, in part, applying the same clock signal to the linear-feedback shift registers disposed in the first and second ICs.

In one embodiment, the method further includes, in part, decoding the seeding key using a multitude of states of a state machine. In one embodiment, the decoding of the data is performed by a Joint Test Action Group block disposed in the second IC. In one embodiment, the state machine is disposed in a test access port controller disposed in the JTAG block. In one embodiment, the data is supplied by a multitude of boundary scan chain cells disposed in the first IC. In one embodiment, if the decoded seeding key at the second IC fails to match an expected seeding key, a clock signal causing the second IC to fail to operate is applied to the second IC. In one embodiment, the seeding key is generated using a physically unclonable function of the first IC.

A first integrated circuit, in accordance with one embodiment of the present disclosure, includes, in part, a key management unit configured to generate a seeding key during a start-up phase, an encryption module configured to encrypt data using the seeding key and deliver the encrypted data to a second integrated circuit (IC), and an encoder configured to encode the seeding key and deliver the encoded seeding key to the second IC.

In one embodiment, the first integrated circuit includes, in part, a linear-feedback shift register configured to load the seeding key. In one embodiment, the second IC includes, in part, a decoder configured to decode the seeding key, and a linear-feedback shift register configured to load the decoded seeding key. In one embodiment, the linear-feedback shift registers disposed in the first and second ICs receive the same clock signal.

In one embodiment, the second IC further includes, in part, a state machine having a multitude of states decoding the seeding key. In one embodiment, the decoder is disposed in a Joint Test Action Group block of the second IC. In one embodiment, the state machine is disposed in a test access port controller of the JTAG block. In one embodiment, the first IC further includes, in part, a multitude of boundary scan chain cells configured to supply the data. In one embodiment, the second IC further includes, in part, a comparator comparator configured to deliver to the second IC a clock signal causing the second IC to fail to operate if the decoded seeding key fails to match an expected key. In one embodiment, the seeding key is generated using a physically unclonable function (PUF) of the first IC.

DETAILED DESCRIPTION

Figure 1:
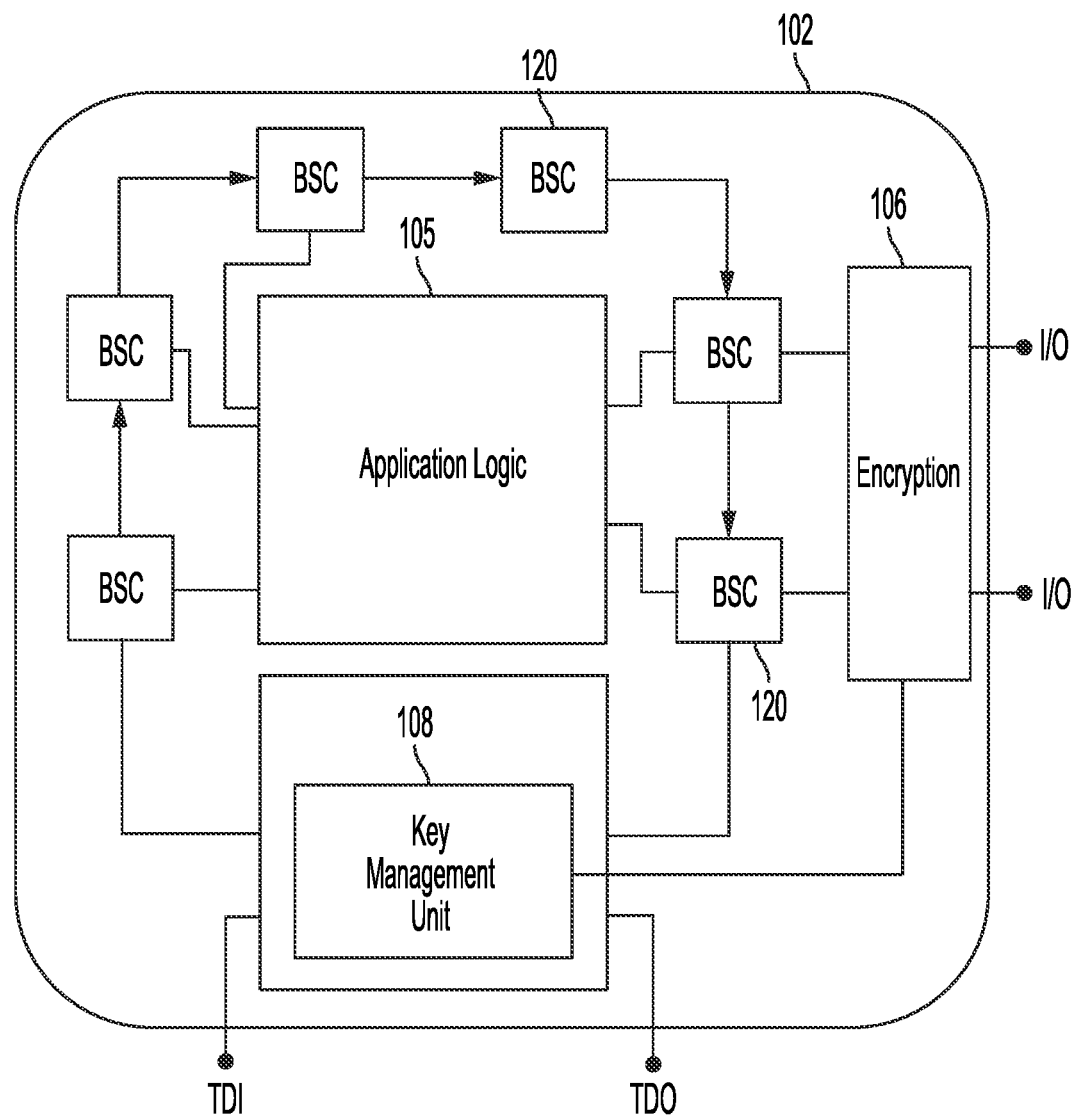
FIG. 1 shows a number of logic blocks configured to encrypt an output of an unobfuscated application logic, in accordance with one embodiment of the present disclosure.

The challenges in technology scaling and/or increased cost of manufacturing has led to an increase in third-party components for the design of a system on a chip (SoC). However, third-party components used in an SoC can result in increased security risks and/or decreased performance of the SoC. For example, one or more portions of the SoC can be reverse engineered to gain access to internal circuitry of the SoC. Such circuitry includes, for example, proprietary security countermeasures designed to protect user-data, and improvement made to enhance the performance of the SoC. Additionally, when a SoC employs a third-party component, an attacker could fabricate a counterfeit SOC, overproduce sub-par variants of the design of the SoC (e.g., leading to overproduction, and the like), make malicious alterations to the SoC by adding, for example, malware to the underlying circuits disposed in the SoC, and the like. Thus, protecting a SoC from an illegal access is highly desirable.

Currently, countermeasures such as logic locking, obfuscation, and the like, may be employed to prevent an attacker from gaining access to the circuits internal to a SoC. However, with the existing countermeasures, an interface with which the SoC communicates with the outside world is still unprotected. For instance, attacks such as a satisfiability attack, a key sensitization attack, and the like, provide a means to gain information about an underlying design of a SoC even when the aforementioned countermeasures are employed. In an example related to a key sensitization attack, an attacker can apply different input patterns to a circuit and observe the generated output. If a static key bit is applied without being masked by another key bit, an attacker can begin to decipher a secret key for the SoC. For both satisfiability and key sensitization attacks, unobfuscated output of a SoC can be used to facilitate the attack. For example, an attacker can apply an input pattern to an SoC and observe outputs generated by the SoC to assist with determining the functionality of the circuits disposed in the SoC. Thus, for a countermeasure to be effective, the input output (I/O) ports of a SoC must be protected from unauthorized third-party access.

To remedy these and/or other security issues, various embodiments described herein relate to securing an IC by encrypting the input/output data of the IC. According to one embodiment, a defense of Joint Test Action Group (JTAG) I/O network (DJIN) architecture is provided to protect one or more I/O communication channels of an IC. The DJIN architecture encrypts one or more inputs and/or one or more outputs of an IC. In one embodiment, the DJIN architecture may include, in part, a JTAG module that manages communications with the IC, and/or a key module. The key module is configured to generate one or more keys. The key module is further configured to communicate the one or more keys across one or more other IC in a timely and safe manner. In some embodiments, the one or more keys can be shared during the start-up phase of the IC. In one embodiment, the key module is disposed in the IC. The key module may be synchronized using a common seeding key. One or more algorithms can also be used to facilitate implementation of the key module. In one embodiment, the DJIN architecture may be disposed in an IC that may or may not be obfuscated. The DJIN architecture may further be optimized to reduce the overhead.

In one embodiment, the I/O level encryption may be provided through modification of a JTAG architecture. Furthermore, a key management system configured to generate and/or synchronize the keys between multiple ICs is provided. In some embodiments, the encryption system and the key management system enable multiple chips to communicate with encrypted transmissions. In some embodiments, the DJIN architecture provides a synchronous (e.g., one-key for all) key module. The keys may be synchronized at start up by sharing a seeding key using, for example, a test access port (TAP) controller. The seeding key can be employed to seed (load) a linear feedback shift register to generate a common key set. The DJIN architecture, in accordance with one aspect of the present disclosure, prevents unauthorized access to an IC. The DJIN architecture may be implemented on-chip, and/or as a modification of a JTAG architecture. The DJIN architecture, in accordance with one aspect of the present disclosure, is adapted to enhance security guarantees while maintaining a low overhead with respect to area, power, and delay.

FIG. 1 is a block diagram of a DJIN system 102 adapted to encrypt and secure the input and output of an unobfuscated application logic block disposed therein, in accordance with one embodiment of the present disclosure. System 102 is shown as including, in part, an unobfuscated application logic block 105, an encryption module 106 and a key management unit 108. System 102 is also shown as including, in part, a multitude of boundary scan chain (BSC) cells 120. Encryption module 106 and key management unit 108 may be formed, for example, by modifying a JTAG block disposed in the system. As described further below, during a normal mode of operation, encryption module 106 together with key management unit 108, enable system 102 to operate in a secure manner by encrypting its input/output data. Signals TDI and TDO respectively represent the test data applied to and received from system 102.

Figure 2:
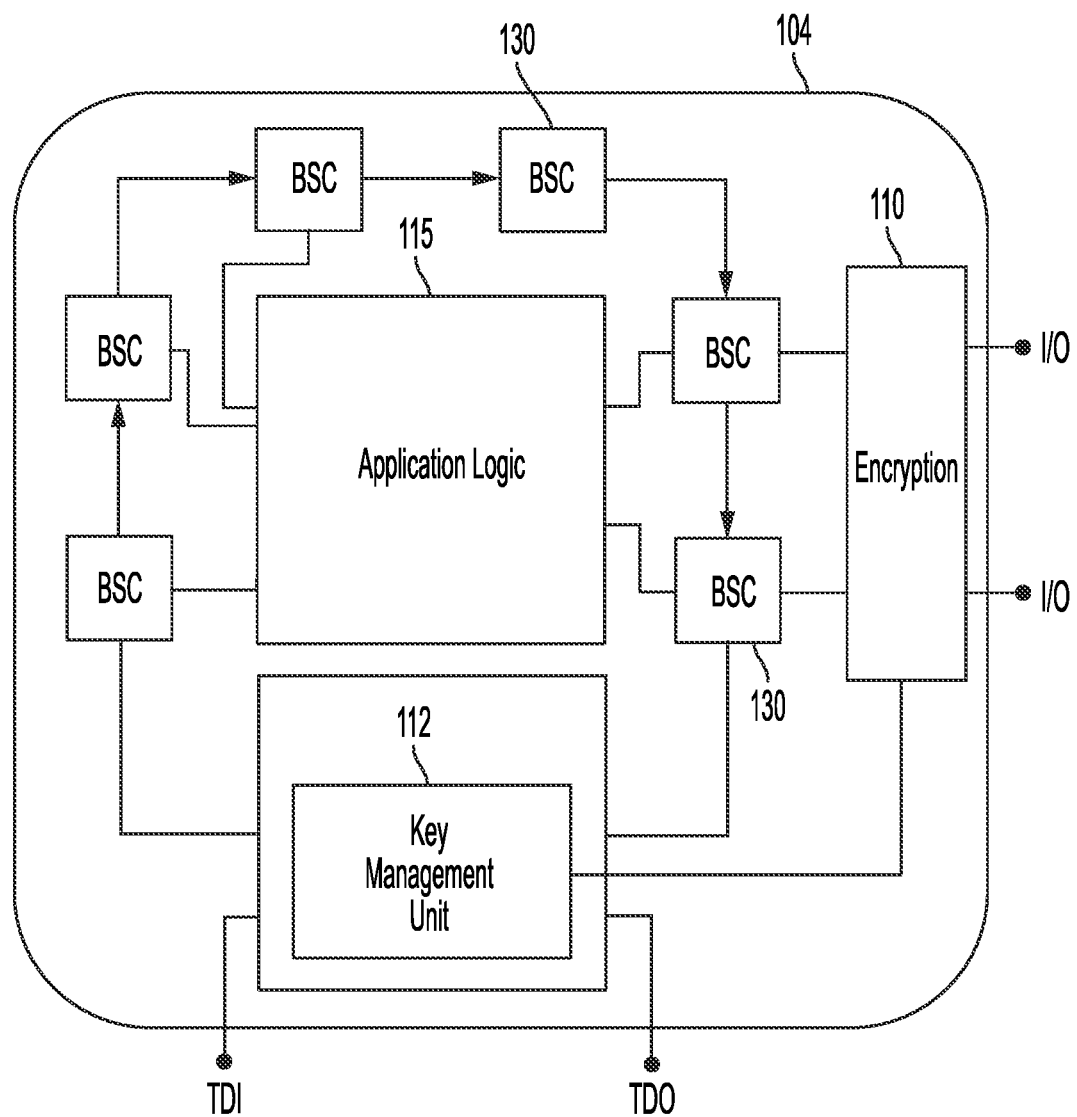
FIG. 2 shows a number of logic blocks adapted to encrypt an output of an obfuscated application logic, in accordance with one embodiment of the present disclosure.

FIG. 2 is a block diagram of a DJIN system 104 adapted to encrypt and secure the input and output of an obfuscated application logic block disposed therein, in accordance with one embodiment of the present disclosure. System 104 is shown as including, in part, an obfuscated application logic block 115, an encryption module 116 and a key management unit 112. Obfuscated logic block 104 is also shown as including, in part, a multitude of boundary scan chain (BSC) cells 130. Encryption module 110 and key management unit 112 may be formed, for example, by modifying a JTAG block disposed in the system. Encryption module 110 and key management unit 112 together provide a level 3 security with a substantially reduced overhead. DJIN systems 102 and 104 inhibit observation and extraction of the functionality of the IC or SoC in which they are disposed, thereby preventing malicious attacks, satisfiability attacks, automatic test pattern generation (ATPG) based attacks, and the like. In some embodiments, an IC may include both an unobfuscated application logic block and an unobfuscated application logic block.

Figure 3:
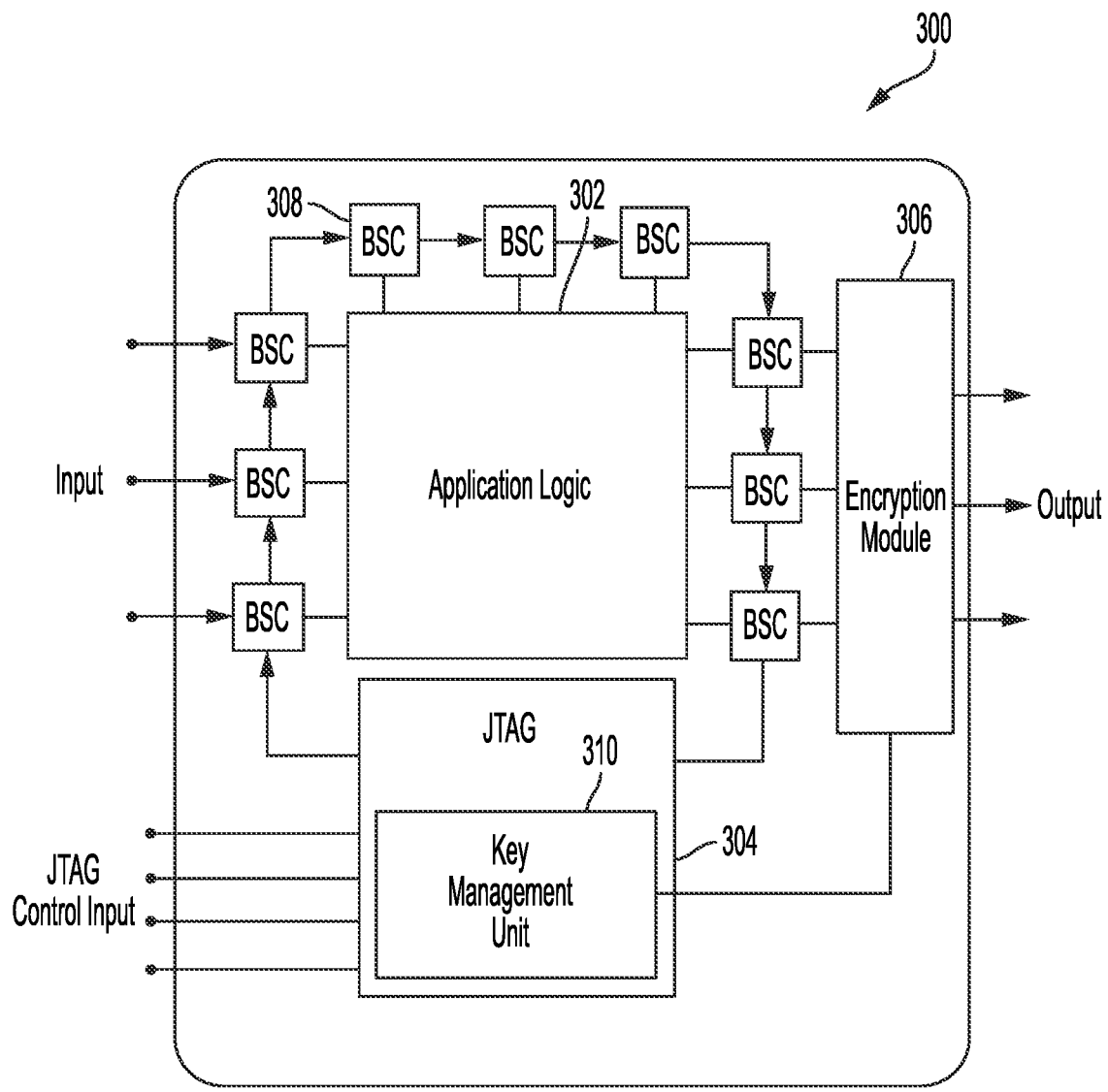
FIG. 3 shows a number of blocks adapted to encrypt an output of an application logic block of a circuit, in accordance with one embodiment of the present disclosure.

FIG. 3 is a block diagram of a DJIN system 300, in accordance with another embodiment of the present disclosure. System 300 is similar to system 102 of FIG. 1, or system 104 of FIG. 2, except that in system 300, key management unit 310 is formed from components disposed in JTAG block 304. JTAG block 304 is also shown as receiving a number of JTAG control signals. Several of BSC cells 308 are also shown as receiving input signals.

Key management unit 310 is configured to generate one or more keys that may be unique and/or randomly generated. The keys may be repeatedly refreshed to ensure strong encryption. Key management unit 310 may provide a synchronous key (e.g., one-key for all) with a common seeding key shared between multiple ICs at start-up using a test access port (TAP) controller. Key management unit 310 may further be configured to manage synchronization between multiple ICs. Encryption module 306 together with BSCs 308 provides run-time encryption with low computing cost. Key management unit 310 is adapted to manage the generation, synchronization, and storage of keys. A TAP controller may be used to communicate key bits as described further below.

Figure 4:
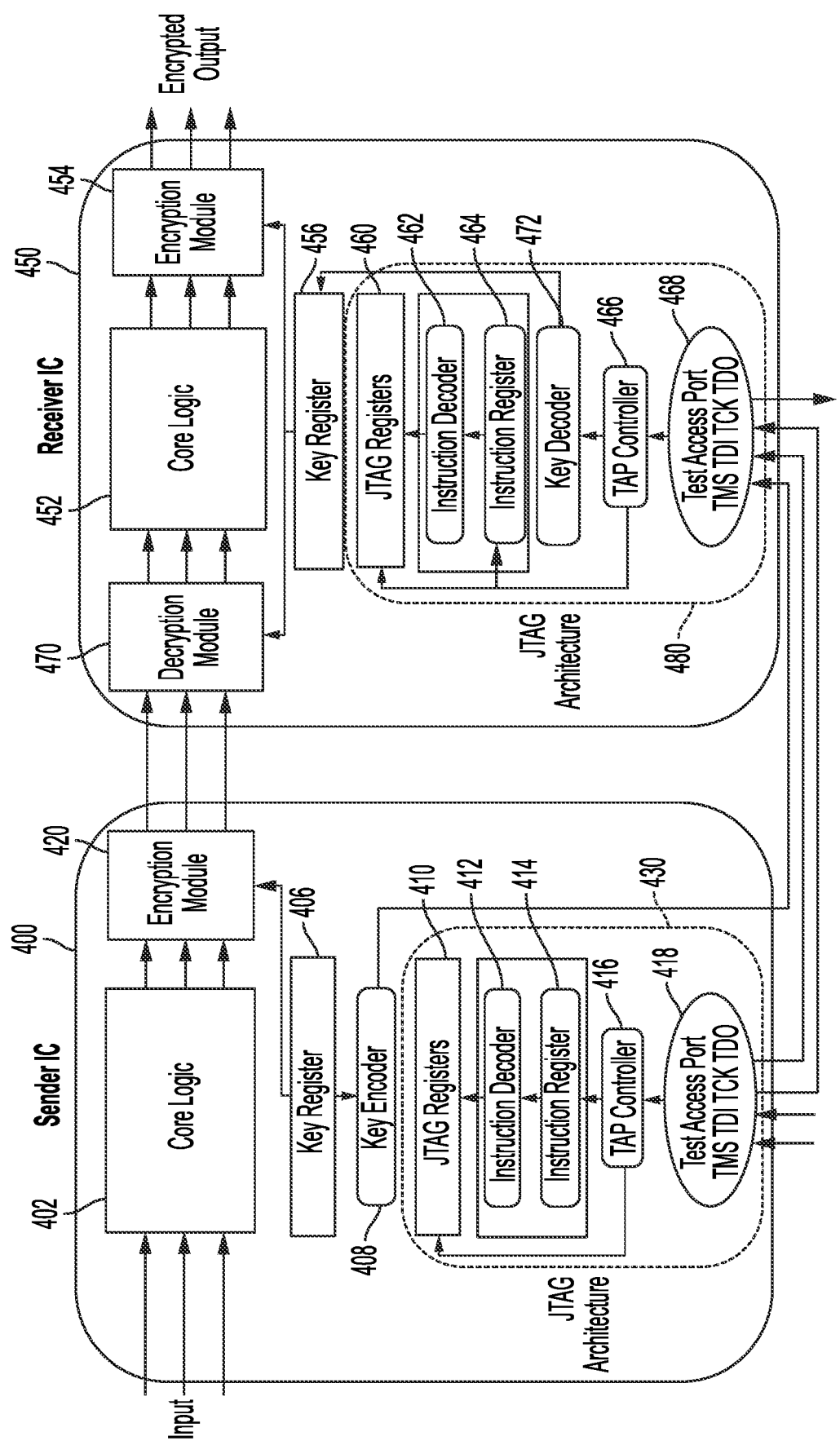
FIG. 4 shows a pair of ICs that communicate using data encrypted in accordance with one embodiment of the present disclosure.

FIG. 4 shows a first IC 400 in communication with a second IC 450. IC 400 is shown as transmitting data received by IC 450. Data generated by core logic 402 of IC 400 is encrypted by encryption module 420 before being transmitted to IC 450. The encrypted data is received and decrypted by decryption module 470 before being supplied to core logic 452 of IC 450. JTAG block 430 is used for testing of IC 400 and for controlling the data that is shifted into the BSC cells (not shown in FIG. 4) of IC 400. Similarly, JTAG block 480 is used for testing of IC 450 and for controlling the data that is shifted into the BSC cells (not shown in FIG. 4) of IC 480.

Key register 406 supplies the key bits that are used by encryption module 420 to encrypt data supplied by core logic 402. The key bits are also encoded by key encoder 408 and transmitted to TAP 468 of IC 450. TAP 468, in addition to other functions, delivers the encoded keys to key decoder 472 via TAP controller 466. The keys decoded by key decoder 472 are delivered to and stored in key register 456. Decryption module 470 decrypts the data it receives from encryption module 420 using the key bits supplied thereto by key register 456. In one embodiment, the decrypted data is delivered to a boundary scan chain. As described further below, in one embodiment, the data is encrypted using, for example, an XOR gate. In such embodiments, the XOR gate receives a data bit and a key bit to generate the encrypted output.

As seen from FIGS. 3 and 4, in accordance with one aspect of the present disclosure, an encryption module/layer is disposed between the core (application) logic and the I/O pins. In one embodiment, this is accomplished by including additional circuitry to a boundary scan chain. Adding an encryption module to the scan chain enables a user/designer to perform run-time encryption with low computing cost.

Referring to FIG. 4, JTAG block 430 of IC 400 is shown as including, a multitude of JTAG registers 410, an instruction decoder 412, an instruction register 414, a TAP controller 416 and a TAP 418. Similarly, JTAG block 480 of IC 450 is shown as including a multitude of JTAG registers 460, an instruction decoder 462, an instruction register 464, a TAP controller 466, a key decoder 472, and a TAP 468.

In one embodiment, data is transmitted through a boundary scan architecture (BSA). As is known, the BSA is an extensive design-for-test (DFT) structure adapted to inspect the interconnects on a printed circuit board (PCB). In one embodiment, a BSA design based on the JTAG, or the IEEE 1149.1 standard, is used to shift the input test patterns within the BCS cells.

Figure 5A:
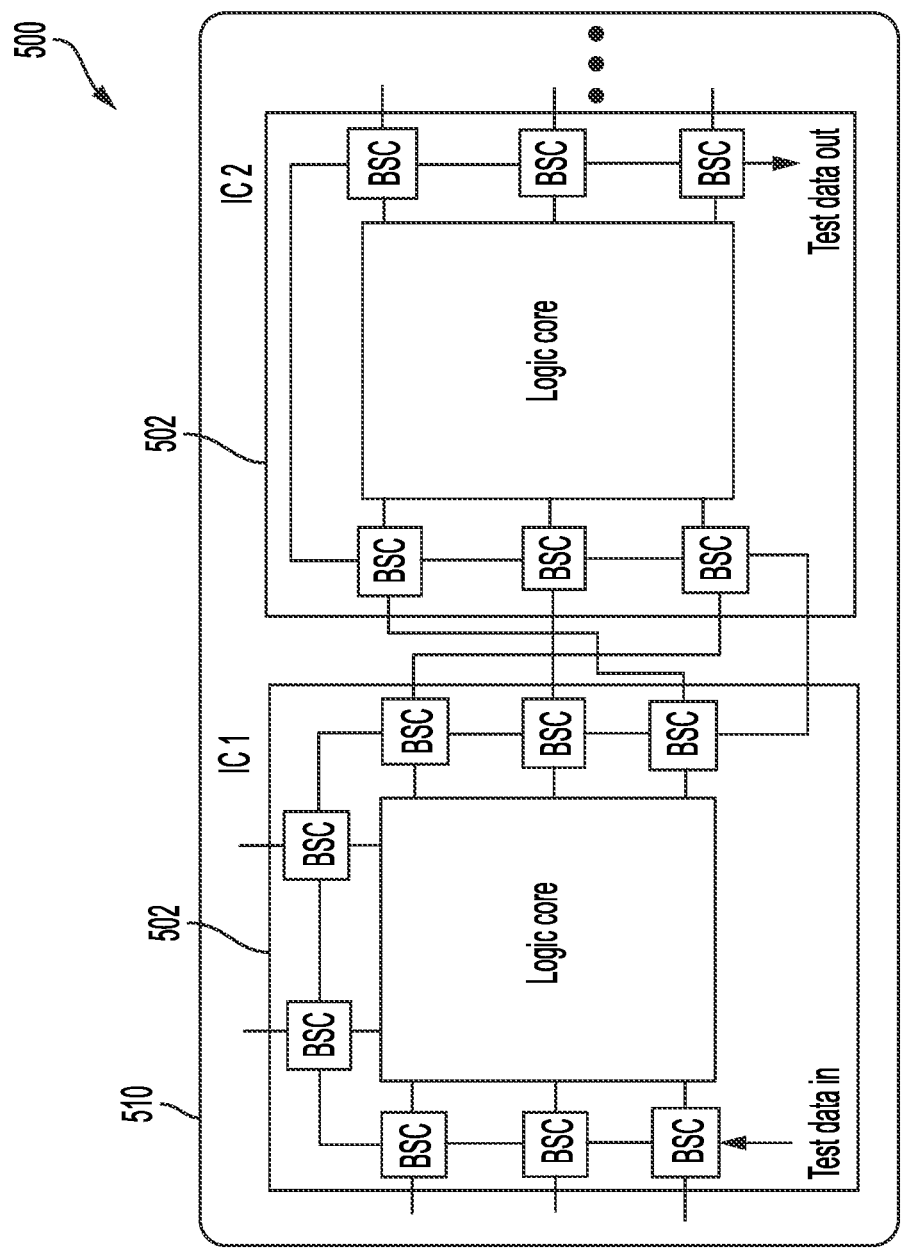
FIG. 5A shows a multitude of boundary scan chain cells positioned along the peripheries of a pair of integrated circuits.

FIG. 5A illustrates a multitude of BSC cells positioned along the peripheries of each of a pair of ICs 502, 504 both of which are disposed on a printed circuit board (PCB) 510. Test data applied to IC 502 may traverse the BCS cells of IC 502 before entering the BSC cells of IC 504.

Figure 5B:
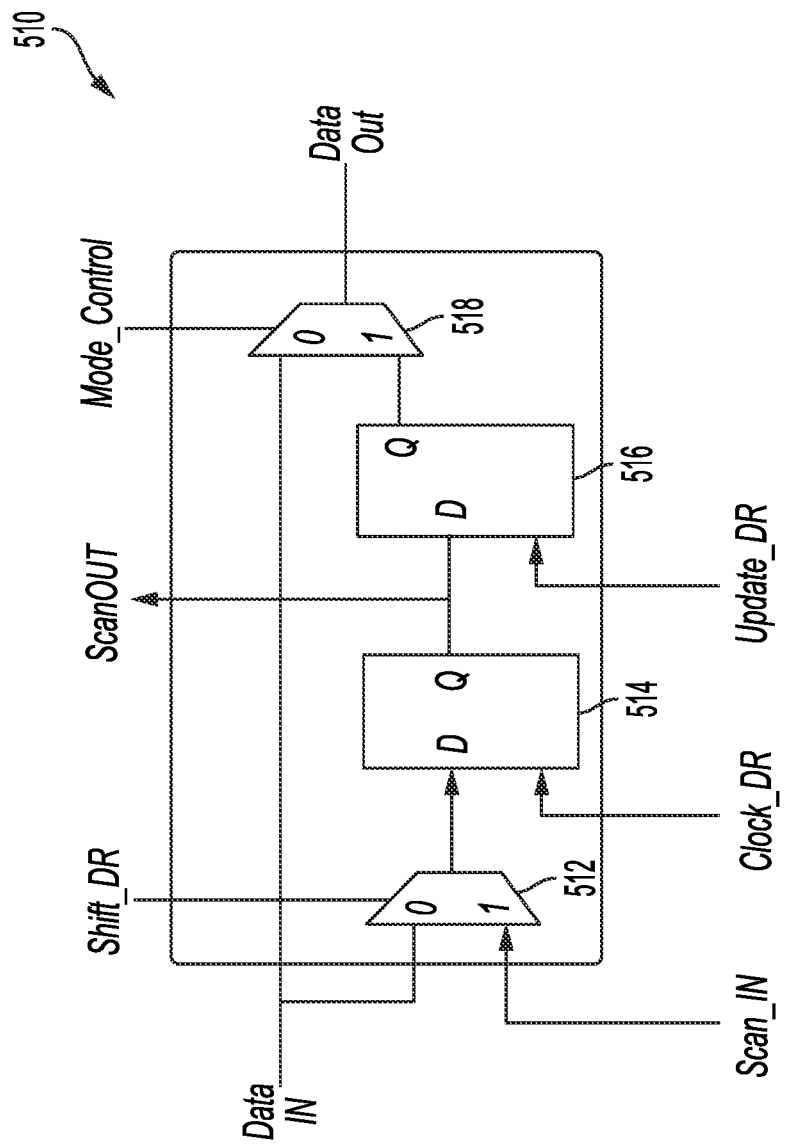
FIG. 5B shows a number of logic elements disposed in a boundary scan chain cell.

FIG. 5B shows one cell (stage) 510 of a BSC. Multiplexer 512 selects between Data_In and Scan_In inputs using select terminal Shift_DR. The output of multiplexer 512 is received by register 514 having an output that is received by register 516. Registers 514 and 516 are respectively clocked by clock signals Clock_DR and Update_DR, The output of register 516 is delivered to a first terminal of multiplexer 518 that receives signal DATA_IN at its second input terminal. Signal Mode_Control selects between the first and second inputs of multiplexer 518.

As shown, a boundary scan chain cell can shift or capture data from logic cores and/or input pins. A boundary scan chain cell can shift serial input from a JTAG interface. Boundary scan chain cells are connected in a similar manner as a shift register in a boundary scan register. A boundary scan chain cell can deliver a signal to or receive a signal from a pin, an adjacent boundary scan cell, and/or core logic. A test vector may be applied to a BSC cell via Scan_IN input and shifted out via Scan_OUT output. Register 516 can provide data externally through I/O pins.

Figure 5C:
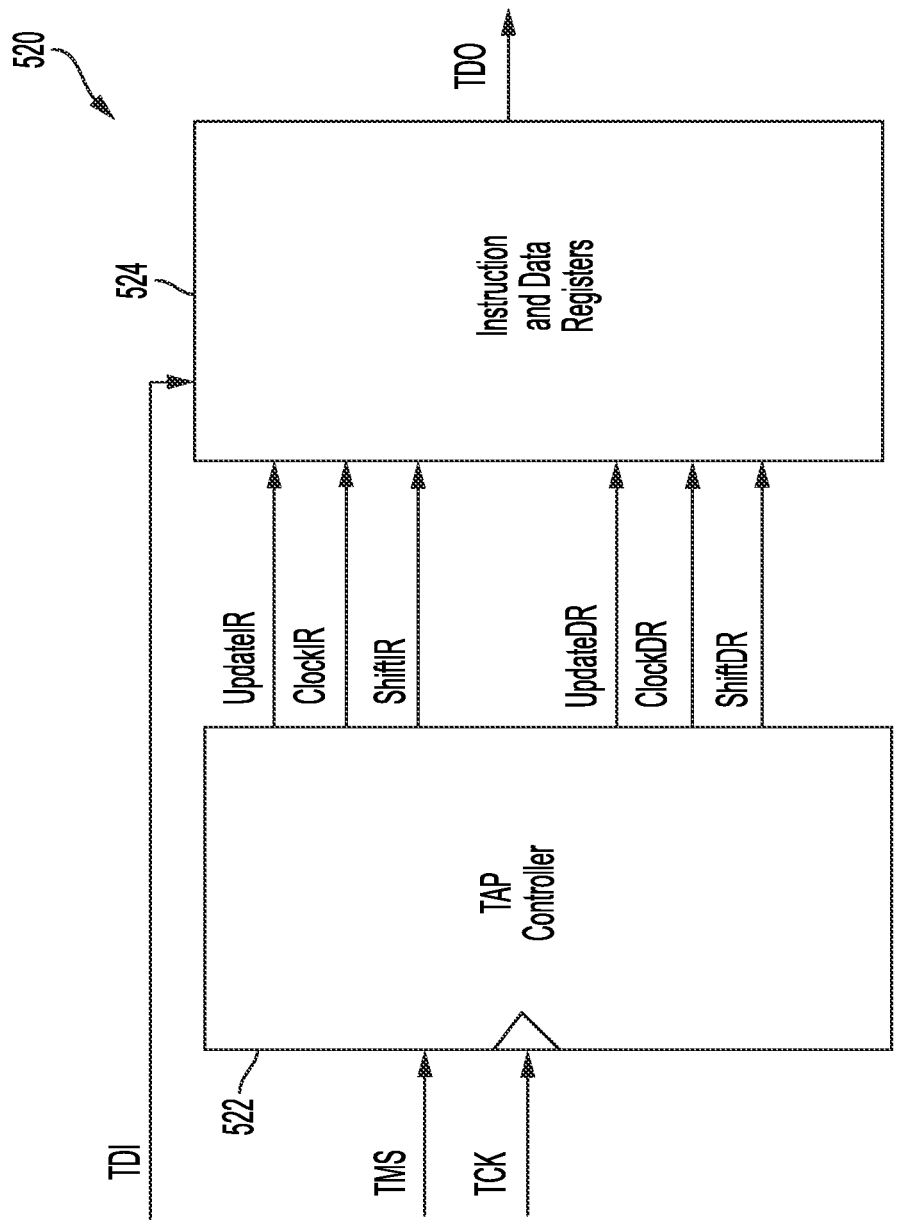
FIG. 5C shows a number of logic elements of a JTAG block.

FIG. 5C show a number of logic elements of a JTAG block 520. JTAG block 520 is shown as receiving input signals TMS, TCK and TDI, and generating output signal TDO. JTAG block 520 is also shown as including, in part, a TAP controller 522, as well as instruction register, instruction decoder, bypass register, boundary-scan register, and Device ID register collectively identified as being disposed in block 524. TAP controller 522 is a finite state machine triggered by clock signal TCK. The state machine's state is changed in response to signal TMS. The output of TAP controller 522 includes clocks and control signals for the registers disposed in block 524. TAP controller 522 is configured to scan the input test vector into the boundary-scan register, or to send an instruction code into the instruction register.

The instruction register receives an instruction (e.g., Sample, Preload, Extest). The instruction decoder decodes the received instruction to generate a multiplexer signal to control the output. The bypass register, when selected, provides a direct path between signals TDI and TDO to bypass the on-chip system logic. Device ID register is an optional register used for loading vendor-related information such as device-specific identification number. The register decoded by the output of the instruction register provides a path between signals TDI to TDO.

TAP controller 522, which conforms to the IEEE standard 1149.1, is a 16-state finite state machine (FSM) controlled by clock signal TCK. TAP controller 522 uses the TMS signal to control the JTAG operation. A decoded instruction is loaded into the instruction register to enable the data from the BSC cells to be shifted out serially using signal TDO. Consequently, all the capture registers in the BSC operate as a shift register chain.

Figure 6:
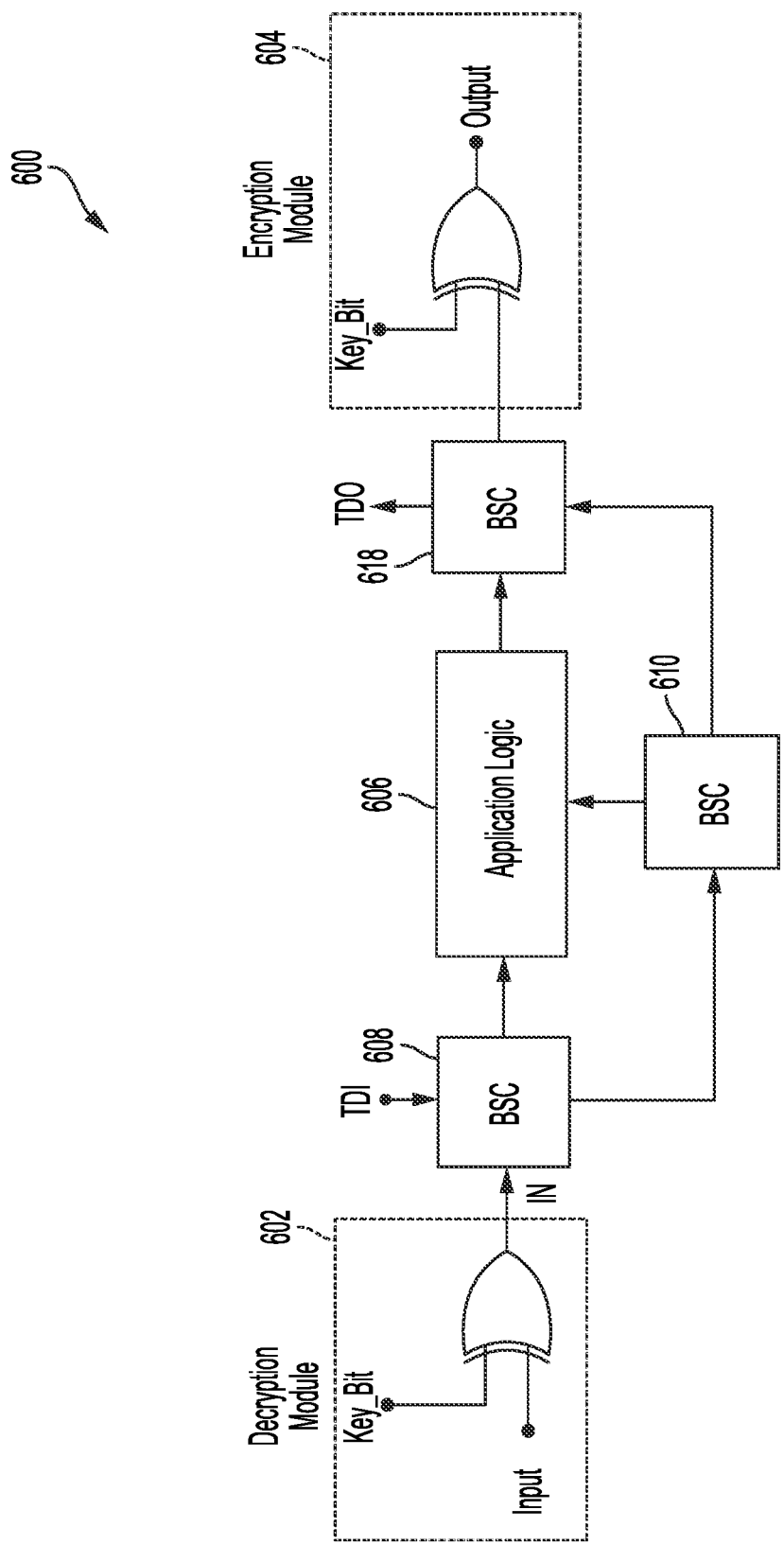
FIG. 6 is a simplified block diagram of a number of logic elements configured to encrypt and decrypt data, in accordance with one embodiment of the present disclosure.

FIG. 6 shows a decryption module, an encryption module, an application logic, as well as a number of logic elements disposed therebetween, in accordance with one aspect of the present disclosure, as is also shown with reference to IC 450 of FIG. 4. Encryption module 604 is a stream cipher that performs an XOR operation on the data bit received from BSC 618 using the key bit "Key_bit" to generate the encrypted output signal Output. Decryption module 602 includes an XOR gate that receives the encrypted data "Input" at its first input terminal and the key bit "Key_bit" at its second input terminal to generate and deliver a decrypted bit IN to BSC 608. Bit IN may be delivered either to application logic block 606 or to BSC 608 in response to signal TDI. The output of application logic block 606 is sent to encryption module 604 via BSC 618. Signals TDI an TDO respectively refers to input and output test data.

A stream cipher is secure only if the key used for encryption changes relatively quickly and on a period basis. A key management unit, such as those shown in FIGS. 1 and 2, are configured to generate new keys, encode/decode the TAP states, synchronize the keys between various chips, and store them. In accordance with one aspect of the present disclosure, a seeding key is generated in an IC sending the key (referred to as the sending IC). The seeding key is then synchronized with one or more ICs receiving the seeding key (referred to herein as the receiving IC) at start up. The seeding key is loaded in a linear-feedback shift register (LFSR) of each IC. The LFSRs disposed in different ICs perform the same operation, thus causing the same key to be generated in all ICs.

Referring to FIG. 3, the key management unit 310 may be implemented as a modification of JTAG architecture by using the TAP controller states to signify a '1' or '0'. Typically, the TAP states determine what register is being used or what JTAG instruction is to be executed. However, by having certain states represent key bits, transition between different states is made in a certain order to transmit a key securely.

Figure 7:
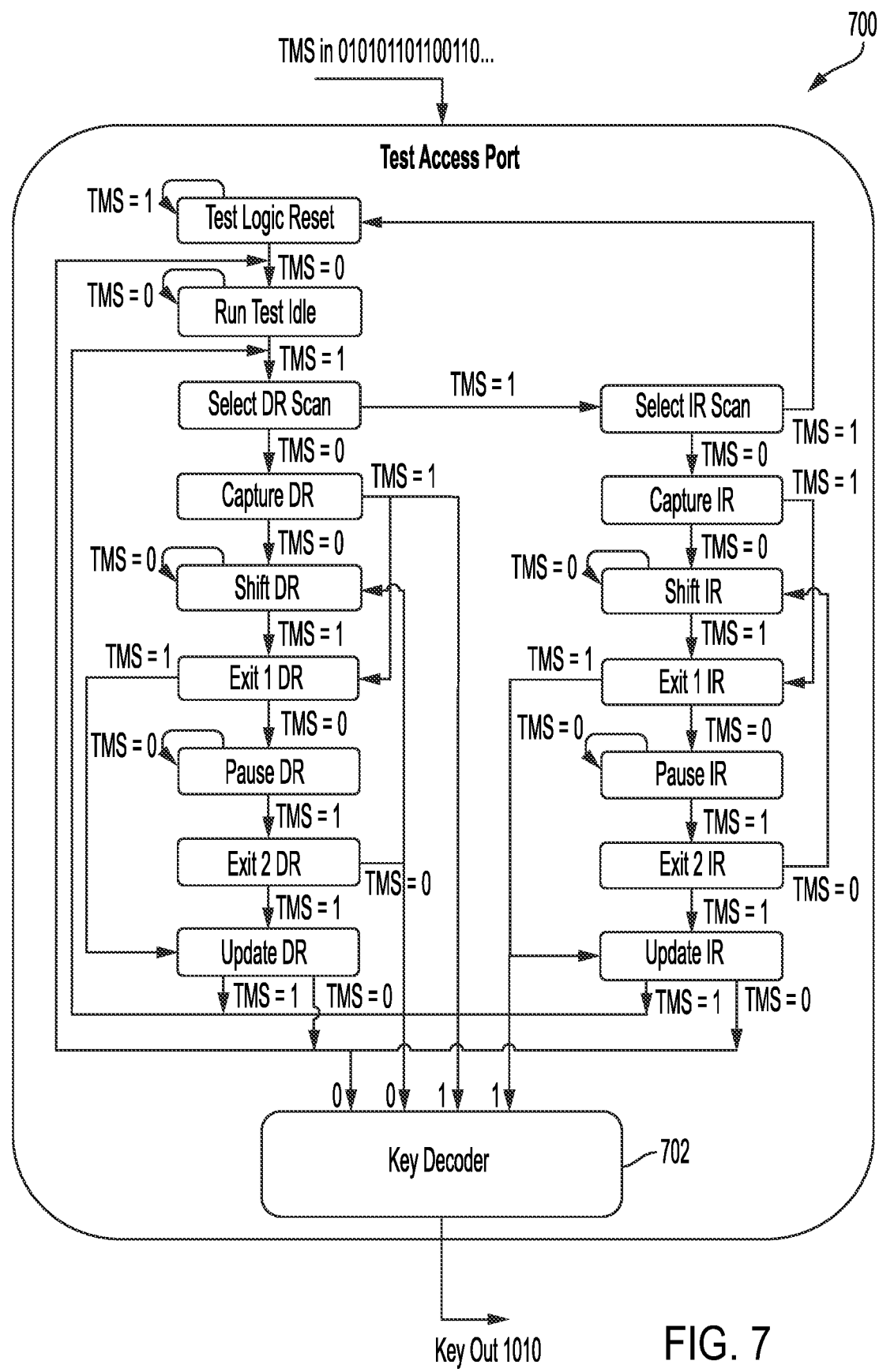
FIG. 7 shows state transitions of a state machine disposed in a test access port controller of a JTAG system, in accordance with one embodiment of the present disclosure.

Referring to FIG. 7, the TAP state machine is shown with four states representing the key bits. For example, a transition from the "Capture DR" state to the "Exit 2 DR" state indicates a key bit of 1. A transition to either the "Update DR" or the "Update IR" states, indicates a key bit of 0. To an attacker, the signal sent over the TMS line does not reveal any information about the key as long as the attacker does not know which states represent which bit values. This allows keys to be transmitted between ICs in a secured manner and with minimal additional circuitry or computation.

The seeding keys are generated only once at a sender IC at start up. This can be achieved by a generator which can be implemented as a physically unclonable function (PUF). The PUF can generate a key which is then sent to a key encoder. The key encoder encodes the key and sends it to the receiver IC's TAP controller. A key decoder disposed in the receiver IC subsequently translates the TAP states into the proper seeding key. The shared seeding keys are then used by the LFSRs disposed in different ICs to circularly shift the data. Such operations result in the generation of a set of keys that are rotated through using the initial seeding key. Since both ICs will have their associated LFSRs performing the same operation while synchronized to the same clock, the same keys are generated in both ICs.

Figure 8A:
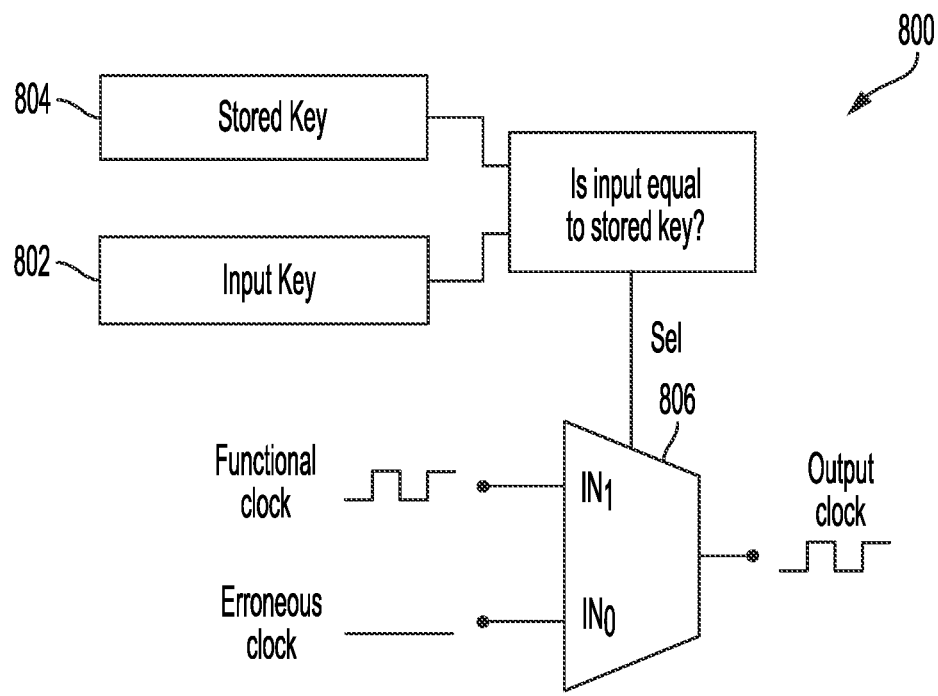
FIGS. 8A and 8B show various components of a logic block adapted to compare a stored key to an input key, in accordance with one embodiment of the present disclosure.
Figure 8B:
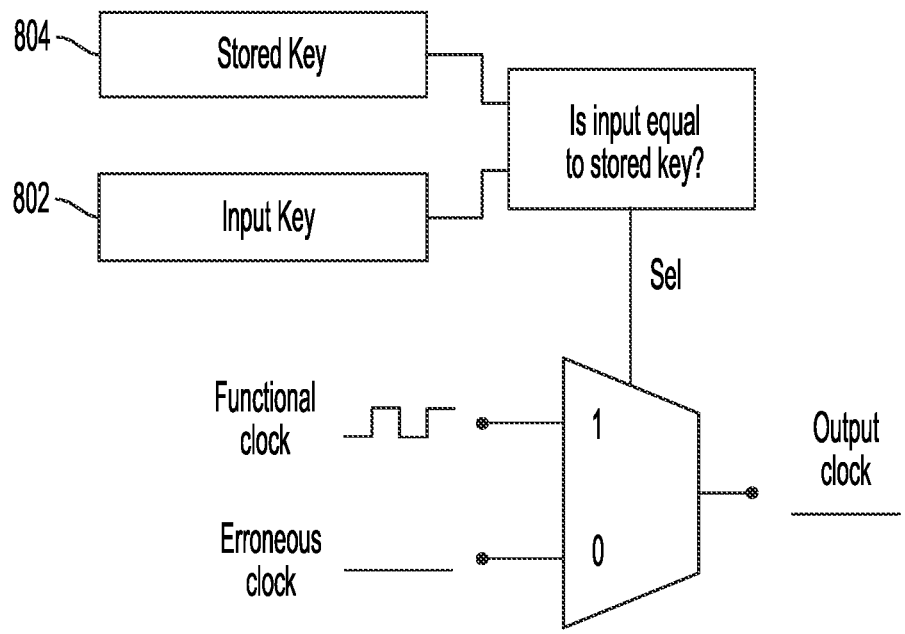

As is known, in digital circuits, a clock signal is used to synchronize a sequence of actions. A clock signal may be used across multiple ICs to perform the same action. If a clock is interrupted, then all clock-dependent actions cease. In accordance with one aspect of the present disclosure, a lock is placed on the clock signal, so as to prevent circuit operation when a proper key is not presented. In one embodiment, this is achieved by comparing an input key with a stored key using a multiplexer as a switch. In FIG. 8A, the input key 802 is detected as matching the stored key 804, thus causing the select terminal Sel of multiplexer 806 to select the functional clock at input terminal $IN_1$ of the multiplexer so as to maintain proper operation. In FIG. 8B, the input key 802 is detected as not matching the stored key 804, thus causing the select terminal Sel of multiplexer 806 to select the erroneous clock at input terminal $IN_0$ of the multiplexer. The selection of the erroneous clock prevents the operation of the circuit, therefore causing the circuit to go into a locked mode.

As described above, in order for a stream cipher to remain secure, keys being used for encryption of I/O pins are periodically regenerated on-chip. As is also described above, in one embodiment, an LFSR may be used to generate pseudo-random keys. In another embodiment, a true random number generator (TRNG) is used to make repetition of keys less likely. The use of physically unclonable functions (PUFs), along with either an LFSR or TRNG, may thus be used to generate robust keys. A PUF makes use of unique characteristics of an IC caused by slight manufacturing variations present in the IC to generate random keys that are unique to the IC. An LFSR or TRNG used together with a PUF can result in keys that are nearly impossible to replicate.

Figure 9:
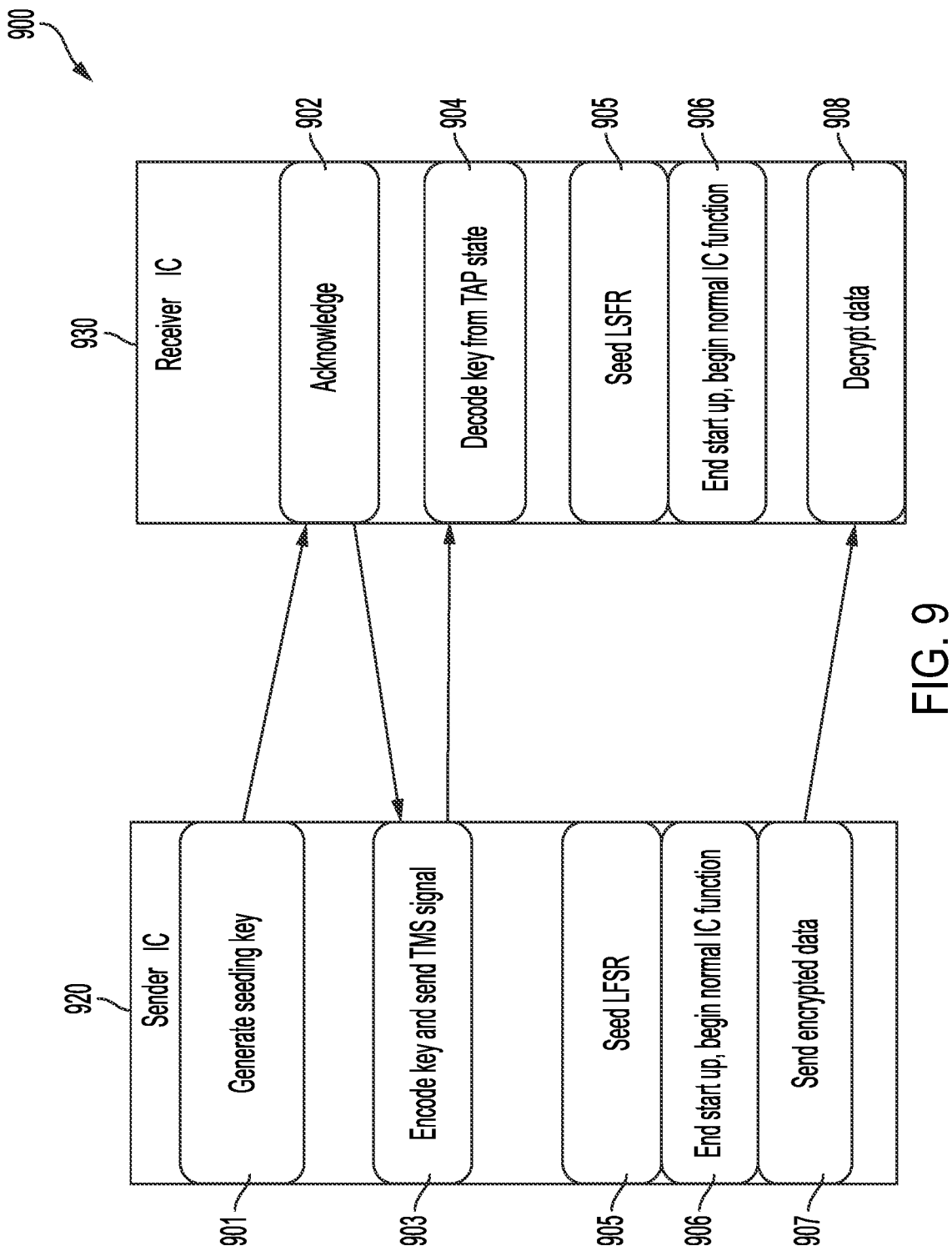
FIG. 9 shows a process for key synchronization between a sender circuit and a receiver circuit, in accordance with one embodiment of the present disclosure.

FIG. 9 shows a process 900 for key synchronization between a sender IC 920 and a receiver IC 930, in accordance with one embodiment of the present disclosure. During the start-up phase at 901, a seeding key is generated at the sender IC using, for example, a PUF of the IC. After receiving the seeding key from the sender IC, the receiver IC sends an acknowledgement back to sender IC at 902. At 903, the seeding key is sent to the key encoder disposed in IC 920 to encode the key and translate it to a TMS signal which is then sent to the receiver IC. The receiver IC's key decoder then reconstructs the seeding key from the TMS signals at 904 using the TAP states, as described above. At 905, both the sender and receiver ICs load the same seeding key into their respective LFSR. While using the same clock signal, the LFSRs generate the same set of keys synchronously.

Figure 10:
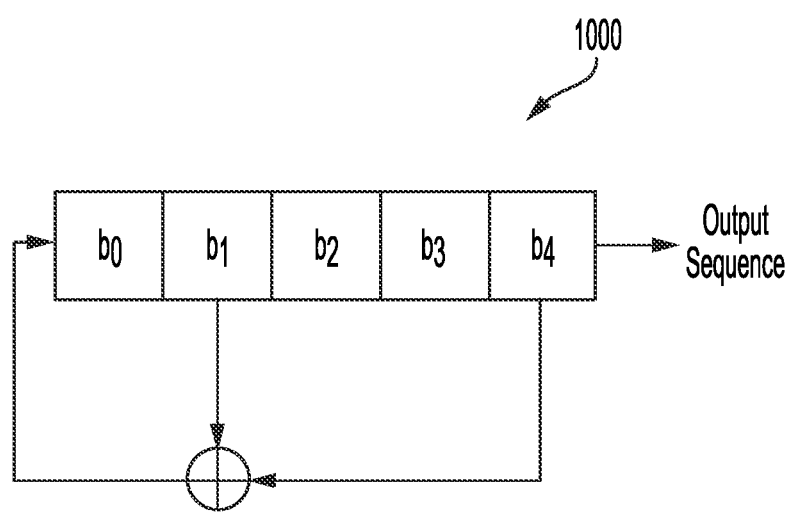
FIG. 10 show an exemplary 5-bit linear feedback shift register.

At 906, the start-up operations of the ICs end and normal IC functions begin. At 907, the data from the sender IC is encrypted and transmitted to the receiver IC. The receiver IC decrypts the encrypted data at 908. Accordingly, encrypted data is sent from the sender IC to the receive IC with minimal communication for key management. FIG. 10 show an exemplary 5-bit LFSR 1000 storing bits $b_0, b_1, b_2, b_3, b_4$, of a 5-bit seed value 'b'. As described above, the bits are shifted out of the LFSR.

Figure 11:
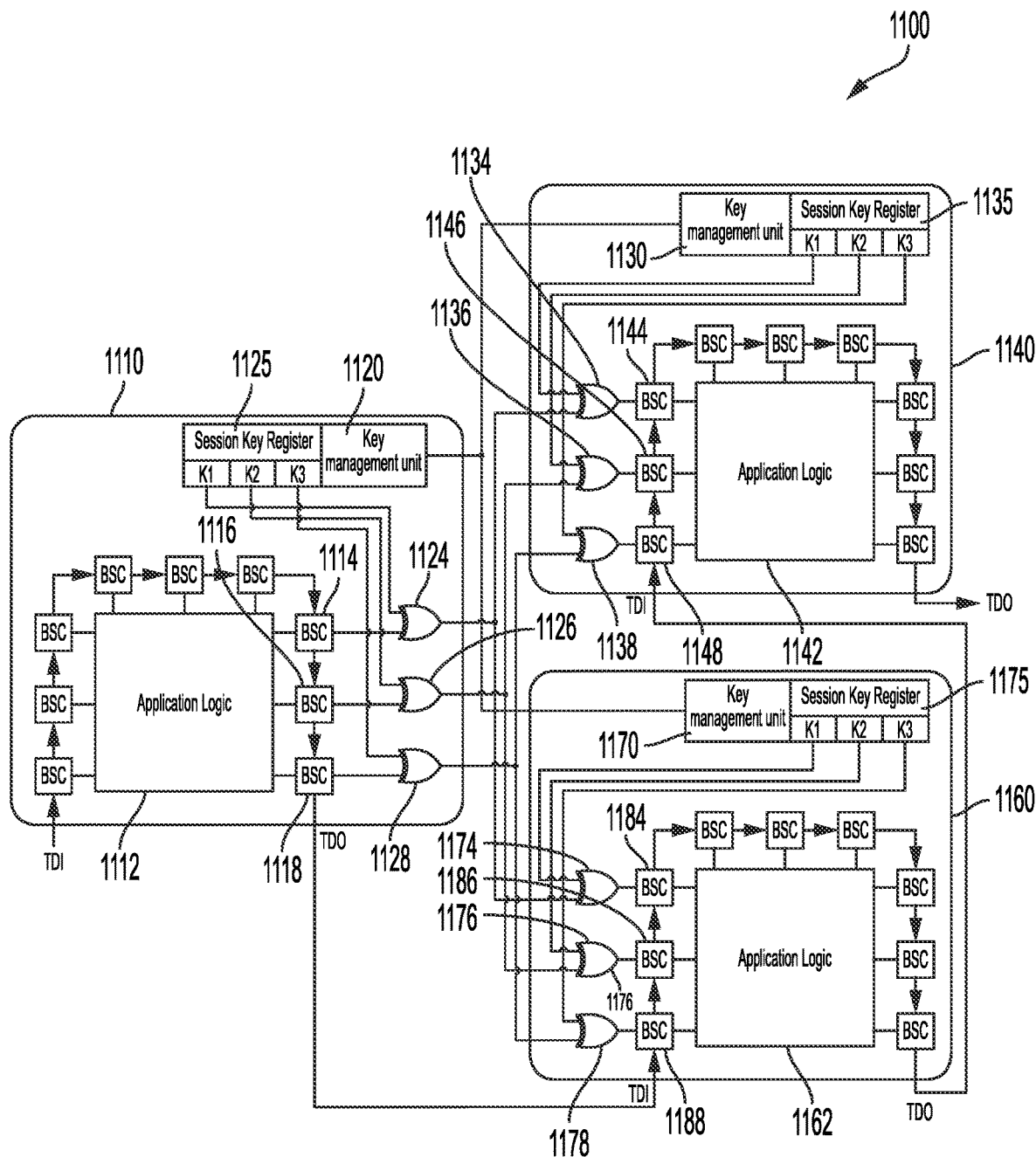
FIG. 11 shows a first circuit that is in communication with second and third circuits using encrypted data, in accordance with one embodiment of the present disclosure.

If multiple ICs are in communication with each other, the receiving ICs receive the encrypted data from the sender IC and using an XOR gate, apply the same key bit in order to decrypt the data, as described above. FIG. 11 depicts a sender IC 1110 that is in communications with receiver ICs 1140 and 1160 in parallel. To manage the communication, each IC uses an LFSR (see FIG. 10), as described above. At start up, a seeding key is generated and shared between the sender and receiver ICs. The shared seeding key is loaded into the ICs associated LFSRs that are synchronized using a shared clock signal to perform the same operations. Accordingly, each IC generates the same set of keys and is therefore able to securely encrypt and decrypt the messages that is transferred between the ICs.

Data bits supplied by BSC cells 1114, 1116, 1118 of sender IC 1110 are shown as being encoded using session key register 1125 bits K1, K2, K3, by XOR gates 1124, 1126 and 1128, respectively, before being transmitted to receiver ICs 1140 and 1160. Session key register 1125 is configured to store the key maintained in the associated LF SR of IC 1110, and transfer the stored key to session key registers 1135 and 1175 of ICs 1140 and 1160 respectively. The encoded data received by IC 1140 is shown as being decoded by XOR gates 1134, 1136, 1138 using the same bits K1, K2, K3 stored in session key register 1135 of IC 1140 before being supplied to BSC cells 1144, 1146 and 1148 of IC 1140. In a similar manner, the encoded data received by IC 1160 is shown as being decoded by XOR gates 1174, 1176, 1178 of IC 1160 using the same bits K1, K2, K3 stored in session key register 1175 of IC 1160 before being supplied to BSC cells 1184, 1186 and 1188, respectively, of IC 1160.

Figure 12:
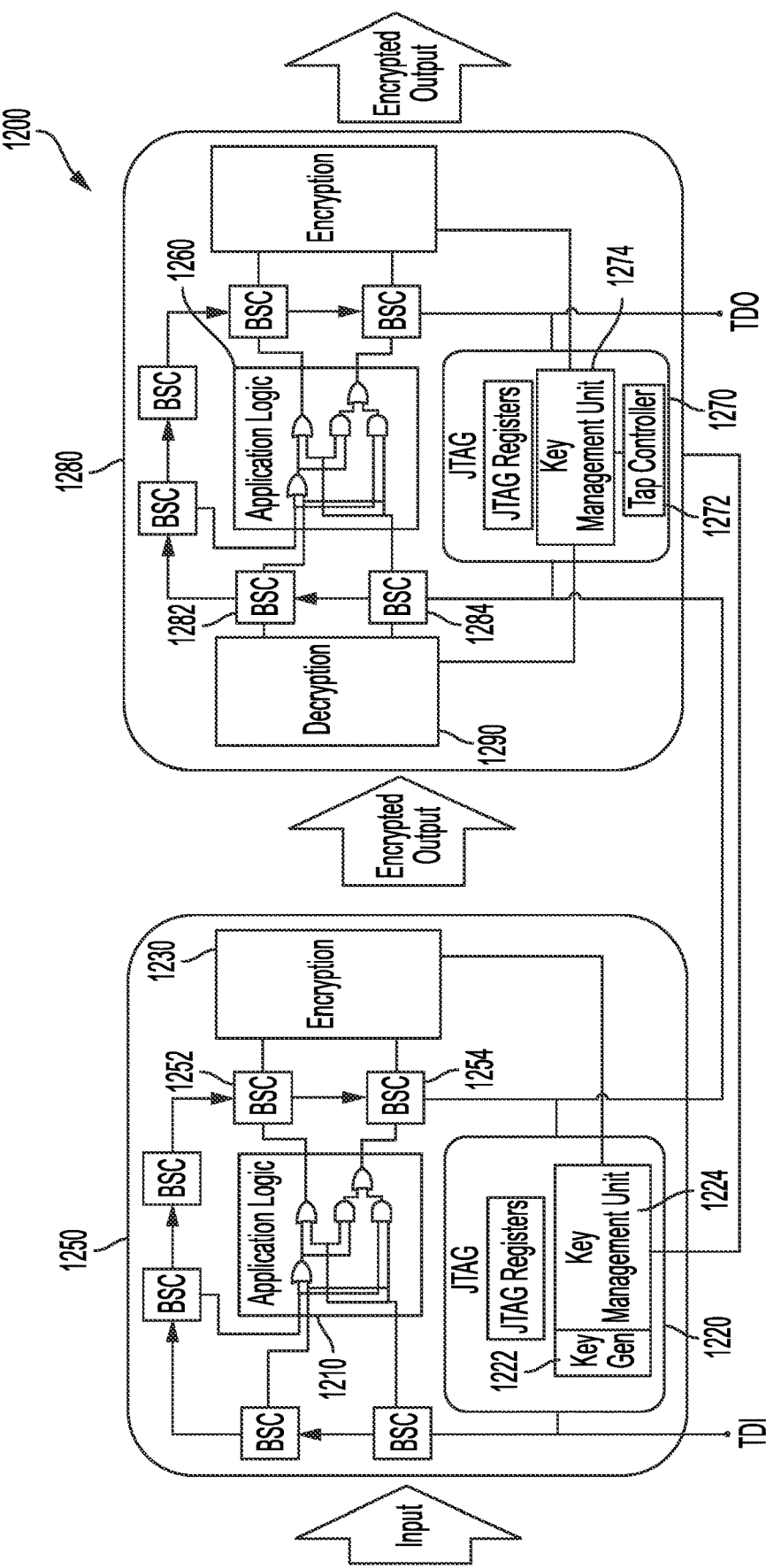
FIG. 12 shows a first circuit that is in communications with a second circuit using encrypted data, in accordance with one embodiment of the present disclosure.

An unobfuscated logic circuit requires a robust and unique key that is random and/or unpredictable. In accordance with the present disclosure, to encrypt data that is to be transferred between two or more unobfuscated ICs, a seeding key is generated at the sender IC during the start-up phase and transferred to the receiver ICs, as described above. FIG. 12 shows a sender IC 1250 in communications with a receiver IC 1280. The seeding key is generated by key generation unit 1222 of IC 1250 using a PUF to ensure the seeding key is unique and difficult to replicate. The seeding key is then encoded to a TMS signal and sent to IC 1280's TAP controller 1272. The receiving IC 1280 is configured to decode the key from the TAP controller 1272's states and load the decoded key in IC 1280's LFSR, as described above. The LFSR (not shown) disposed in IC 1280 generates the seeding key required for decrypting the data supplied by IC 1250. The data supplied by BSC cells 1252 and 1254 is shown as being encrypted by encryption block 1230 using the seeding key generated as described above. Decryption block 1290 decrypts the received encrypted data using the seeding key supplied by TAP controller 1272 via key management unit 1274. The decrypted data are shown as being delivered to application logic 1260 via BSC cell 1282 and 1284 of IC 1280. The ICs communicating with one another may have their scan chains connected to form one longer chain. The process for communication between ICs that are obfuscated is similar to the one described above, except that a less robust form of key generation may be used to transfer encrypted data between the sender and receiver ICs.

Figure 13:
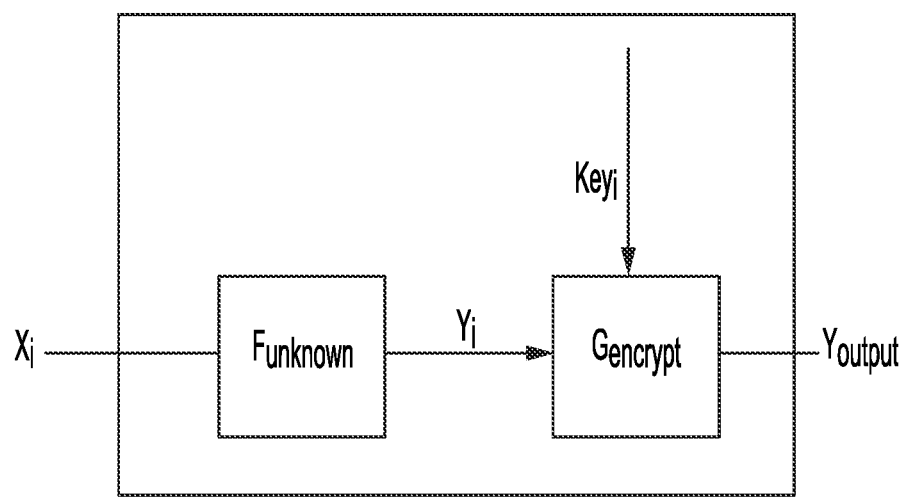
FIG. 13 is a high-level view of an encryption system.

The overall security of the DJIN framework is due to a combination of a number of unknown functions, collectively referred to herein as $F_{unknown}$ and the encryption module $G_{encrypt}$ as shown in FIG. 13. Four cases are described below for analyzing the security of DJIN based on the characteristics of $F_{unknown}$ and $G_{encrypt}$ functions. A malicious attacker may aim to break the DJIN framework by a) recovering the key bits used in $G_{unknown}$ and b) by recovering the nature of the unknown Function $F_{unknown}$. Assume (i) $X_i$ denotes the set of input bits to the circuit, (ii) m is the length of the input, (iii) $Key_i$ denote the set of Key bits used in the encryption process $G_{encrypt}$, and (iv) n is the length of the key.

Figure 14:
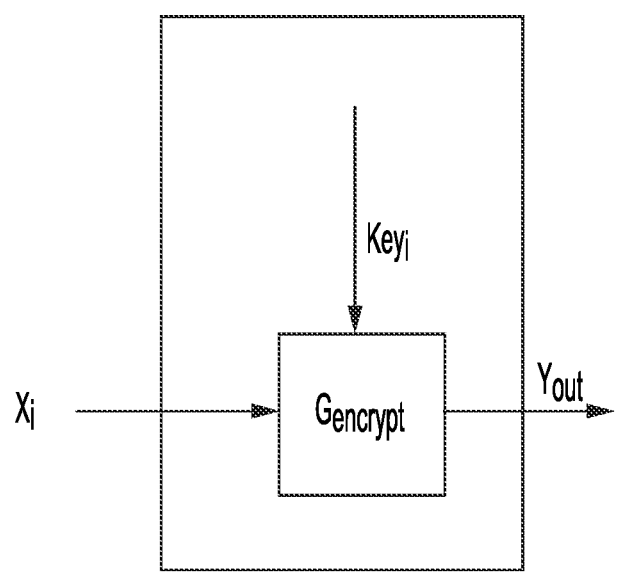
FIG. 14 is a high-level view of an encryption system, in accordance with one embodiment of the present disclosure.

FIG. 14 shows a simplified high-level view of the DJIN framework. An attacker can only observe the output of the encryption module $Y_{output}$ but cannot control the inputs to the module. Similarly, an attacker can control the input of the unknown function $F_{unknown}$ and not observe its output. The operation of the DJIN framework may be described as follows:

$$Y_i = F_{unknown}(X_i)$$

$$Y_{output} = G_{encrypt}(Y_i, Key_i)$$

It is seen that this is different than a conventional encryption procedure shown in FIG. 14 in which the attacker has control over the input $X_i$ and can observe the encrypted output $Y_{output}$.

In accordance with the first case $F_{unknown}$ and $G_{encrypt}$ are linear functions. In such a case, the attacker attempts to break the encryption algorithm and for each attempt requires n tries to break the unknown function $F_{unknown}$. Thus, the complexity to break the overall scheme is defined as O(m×n).

In accordance with the second case, $F_{unknown}$ is linear and $G_{encrypt}$ is non-linear. In such a case, the attacker requires $2^n$ attempts to break the encryption algorithm and for each of those attempts the attacker requires m tries to break the unknown function $F_{unknown}$. Therefore, the complexity to break the overall scheme is defined as $O(m \times 2^n)$ which in this case is $O(2^n)$.

In accordance with the third case, $F_{unknown}$ is non-linear and $G_{encrypt}$ is linear. In such a case, the attacker requires n attempts to break the encryption algorithm and for each of those attempts the attacker requires $2^m$ tries to break the unknown function $F_{unknown}$. Thus, the complexity to break the overall scheme is defined as $O(n \times 2^m)$ which in this case is $O(2^m)$.

In accordance with the fourth case, $F_{unknown}$ and $G_{encrypt}$ are non-linear. In such as case, the attacker require $2^n$ attempts to break the encryption algorithm and for each of those tries the attacker requires $2^m$ tries to break the unknown function $F_{unknown}$. Thus, the complexity to break the overall scheme is defined as $O(2^n \times 2^m)$ which is $O(2^{n+m})$.

The above embodiments of the present invention are illustrative and not limitative. Embodiments of the present invention are not limited by the type of IC transmitting or receiving data. Other additions, subtractions or modifications are obvious in view of the present disclosure and are intended to fall within the scope of the appended claims.

We claim:

1. A method for delivering data from a first integrated circuit (IC), the method comprising:
    generating, by the first IC, a seeding key during a start-up phase of the first IC;
    generating, by a linear-feedback shift register disposed in the first IC, a key based at least in part on the seeding key, wherein the key is one of a set of keys generated by loading the seeding key to the linear-feedback shift register disposed in the first IC;
    encrypting, by the first IC, the data using the key to generate encrypted data;
    encoding, by the first IC, the seeding key to obtain encoded seeding key;
    transmitting, by the first IC, the encoded seeding key to a second IC, wherein the encoded seeding key is decoded to obtain decoded seeding key, wherein the key is generated by a linear-feedback shift register disposed in the second IC based at least in part on the decoded seeding key, and wherein the linear-feedback shift register disposed in the second IC performs the same operation as that of the linear-feedback shift register disposed in the first IC; and
    transmitting, by the first IC, the encrypted data to the second IC, wherein the encrypted data is decrypted using the key.

2. The method of claim 1 further comprising:
    loading, by the second IC, the decoded seeding key to the linear-feedback shift register disposed in the second IC.

3. The method of claim 2 further comprising:
    applying a same clock signal to the linear-feedback shift registers disposed in the first and second ICs.

4. The method of claim 3 further comprising:
    decoding, by the second IC, the encoded seeding key using a plurality of states of a state machine.

5. The method of claim 4 wherein said decoding is performed by a Joint Test Action Group (JTAG) block disposed in the second IC.

6. The method of claim 5 wherein said state machine is disposed in a test access port (TAP) controller of the JTAG block.

7. The method of claim 6 wherein the data is supplied by a plurality of boundary scan chain cells disposed in the first IC.

8. The method of claim 7 wherein if the decoded seeding key at the second IC fails to match an expected seeding key, a clock signal causing the second IC to lock is applied thereto.

9. The method of claim 8 wherein said seeding key is generated using a physically unclonable function (PUF) characteristic of the first IC.

10. A first integrated circuit comprising:
a key management unit configured to generate a seeding key during a start-up phase of the first integrated circuit (IC);
a linear-feedback shift register configured to generate a key based at least in part on the seeding key, wherein the key is one of a set of keys generated by loading the seeding key to the linear-feedback shift register disposed in the first IC;
an encryption module configured to encrypt received data using the key and transmit the encrypted data to a second IC; and
an encoder configured to encode the seeding key to obtain encoded seeding key and transmit the encoded seeding key to the second IC, wherein the encoded seeding key is decoded to obtain decoded seeding key, wherein the key is generated by a linear-feedback shift register disposed in the second IC based at least in part on the decoded seeding key, wherein the linear-feedback shift register disposed in the second IC performs the same operation as that of the linear-feedback shift register disposed in the first IC, and wherein the encrypted data is decrypted using the key.

11. The first integrated circuit of claim 10,
wherein the linear-feedback shift register is configured to store the seeding key.

12. The first integrated circuit of claim 11 wherein said second IC comprises a decoder configured to decode the encoded seeding key, and wherein the linear-feedback shift register disposed in the second IC is configured to load the decoded seeding key.

13. The first integrated circuit of claim 12 wherein the linear-feedback shift registers disposed in the first and second ICs receive a same clock signal.

14. The first integrated circuit of claim 13 wherein the second IC further comprises:
a state machine having a plurality of states decoding the encoded seeding key.

15. The first integrated circuit of claim 14 wherein said state machine is disposed in a Joint Test Action Group (JTAG) block of the second IC.

16. The first integrated circuit of claim 15 wherein said state machine is disposed in a test access port (TAP) controller of the JTAG block.

17. The first integrated circuit of claim 16 further comprising:
a plurality of boundary scan chain cells disposed in the first IC and configured to supply the data.

18. The first integrated circuit of claim 17 further comprising:
a comparator disposed in the second IC, said comparator configured to cause the second IC to receive a clock signal causing the second IC to lock if the decoded seeding key fails to match an expected key.

19. The first integrated circuit of claim 18 wherein said seeding key is generated using a physically unclonable function (PUF) characteristic of the first IC.

* * * * *